US005469087A

United States Patent [19]

Eatwell

[11] Patent Number: 5,469,087

[45] Date of Patent: Nov. 21, 1995

[54] CONTROL SYSTEM USING HARMONIC FILTERS

[75] Inventor: Graham P. Eatwell, Caldecote, Great Britain

[73] Assignee: Noise Cancellation Technologies, Inc., Linthicum, Md.

[21] Appl. No.: 347,422

[22] PCT Filed: Jun. 25, 1992

[86] PCT No.: PCT/US92/05228

§ 371 Date: Dec. 2, 1994

§ 102(e) Date: Dec. 2, 1994

[87] PCT Pub. No.: WO94/00911

PCT Pub. Date: Jan. 6, 1994

[51] Int. Cl.$^6$ .......... H04B 1/10

[52] U.S. Cl. .......... 327/40; 327/42; 327/46; 327/48; 327/555; 327/557

[58] Field of Search .......... 327/40, 42, 46, 327/48, 555, 557

[56] References Cited

U.S. PATENT DOCUMENTS

| | | | |
|---|---|---|---|
| 3,729,679 | 4/1973 | Day, Jr. | 325/49 |
| 3,845,395 | 10/1974 | Murphree | 328/14 |
| 4,328,591 | 5/1982 | Baghdady | 455/303 |
| 4,489,280 | 12/1984 | Bennet, Jr. et al. | 327/46 |
| 4,513,249 | 4/1985 | Baghdady | 328/150 |

FOREIGN PATENT DOCUMENTS

| | | | |
|---|---|---|---|
| 58-85173 | 5/1983 | Japan | 327/40 |

*Primary Examiner*—Margaret Rose Wambach
*Attorney, Agent, or Firm*—James W. Hiney

[57] ABSTRACT

A harmonic filter for active or adaptive noise attenuation control systems for obtaining the complex amplitude of a single harmonic component from a signal which contains one or more harmonic components.

17 Claims, 6 Drawing Sheets

CONTROL SYSTEM USING HARMONIC FILTERS

INTRODUCTION

The invention relates to a harmonic filter which is a signal processing means for obtaining the complex amplitude of a single harmonic component from a signal which contains one or more harmonic components. The filter can be used in active or adaptive control systems for attenuating disturbances.

The idea of separating a reference signal into separate, fixed frequency bands and filtering each band independently is well known and was first used in attempts to control transformer noise. Examples of this are described in U.S. Pat. No. 2,776,020 to W. B. Conover et al and in the article to K. Kido and S. Onoda, "Automatic Control of Acoustic Noise Emitted from Power Transformer by Synthesizing Directivity". Science Reports of the Research Institutes, Tohoku University (RITU), Japan. Series B: Technology. Part 1: Reports of the Institute of Electrical Communication (RIEC), Vol 23, 97–110.

The general idea has been generalized for use with broadband signals and digital systems as noted in U.S. Pat. No. 4,423,289 to M. A. Swinbanks and by I. D. McNicol in "Adaptive Cancellation of Sound in Ducts", M. Eng. Sci. Thesis, Dept. Electrical and Electronic Engineering, University of Adelaide, Australia, (1985).

These systems are all feedforward systems, since the controller output is obtained by filtering a reference signal. These systems use narrow band filters to obtain the real, time varying signal at fixed frequencies. Other approaches, also described in McNicol, use Fourier transform techniques to obtain the complex components of the reference signal and the residual signal at fixed frequencies.

An extension to this approach, which allows for varying frequencies in the disturbance, is to use a timing signal from the source of the disturbance to trigger a sampling device. This results in an exact number of samples in each cycle of the noise, and the harmonic components can then be obtained by a Discrete or Fast Fourier Transform as described in U.S. Pat. No. 4,490,841 to G. B. B. Chaplin et al. With the approach described both input and output processes are synchronized with the timing signal. In the special case of fixed frequencies this approach is equivalent to a feedforward system.

The approaches differ in the way the controller output is obtained and adjusted. In one approach the output is generated by filtering reference signals. The amplitude and phase of each signal is adjusted in the time domain by a variable filter as in Swinbanks, while in the other approach the controller output is updated in the frequency domain using the Discrete Fourier Transform of the residual signal as in Chaplin for varying frequencies, and for fixed frequencies in "Adaptive Filtering in the Frequency Domain" by Dentino et al, IEEE Proceedings, Vol 69, No. 12, pages 474–75 (1978).

The first approach can be implemented digitally by using a frequency sampling filter followed by a two-coefficient FIR filter or by using a frequency sampling filter followed by a Hilbert transformer and two single coefficient filters.

These techniques are described in the aforementioned Dentino reference and in "Adaptive Frequency Sampling Filters" by R. R. Bitmead and B. Anderson, IEEE Transactions, ASSP, Vol. 29, No. 3, pages 684–93 (1981).

For application to active control the standard update methods must be modified to account for the response of the physical system. This can be done by filtering the reference signal through a model of the physical system. An example of this is the "filtered-x LMS" algorithm described in Adaptive Signal Processing by B. Widrow and S. D. Stearns, Prentice Hall (1985). Similarly, this approach has been used for periodic noise, see "A Multichannel Adaptive Algorithm for the Active Control of Start-Up Transients", by S. J. Elliot and I. M. Stothers, Proceedings of Euromech 213, Marseilles (1986). Nelson and Elliot generate reference signals for each harmonic and then filter these signals through two coefficient filters. These parallel filters, one for each harmonic, are then adapted using the filtered-x LMS algorithm.

The Fourier Transform approach of Chaplin has the advantage of being able, in the simplest case, to update the coefficients in a single step. The coefficients of the two point filter, described by Bitmead and Anderson and others, are not independent so they cannot be updated in a single step using the simple LMS algorithm.

The system described by E. Ziegler in U.S. Pat. No. 4,878,188, herein incorporated by reference, has some features of both systems. Here, synchronous sampling of the residual signal is used together with complex reference signals. The adaption is done in the complex frequency domain. This system is a feedback system.

In Ziegler's approach the multiplication of the error signal with the reference signal does not generate independent estimates of the complex harmonic amplitudes, and so the convergence step size used in the update algorithm cannot be chosen independently for each frequency. This is a significant disadvantage, since one of the motivations for using frequency domain adaptive control systems is the desire to update each frequency independently. Bitmead and Anderson, who use fixed frequencies determined by the sampling rate, overcome this by using a moving average filter of length one cycle. Chaplin accomplishes the same for changing frequencies by using synchronous sampling and a block Fourier transform. In U.S. Pat. No. 5,091,953 to Tretter one sees the extension of the teachings of Ziegler and Chaplin to multichannel systems.

None of these systems give orthogonal signals when the phase or amplitude of the noise is varying.

For systems where the frequency of the noises varies significantly, synchronous sampling has two disadvantages. Firstly, the anti-aliasing and smoothing filters must be set to cope with the slowest sampling rate. Since the upper control frequency is fixed, a large number of points may be required per cycle. Secondly, because of the varying sample rate, continuous system identification is complicated.

The system of this invention provides a method for obtaining the complex harmonic amplitudes of a single with varying fundamental frequency without the need for synchronous sampling.

The system can be used for both feedforward and feedback control.

Accordingly it is an object of this invention to provide a method for obtaining the complex harmonic amplitudes of a signal with varying fundamental frequency without the need for synchronous sampling.

Another object of this invention is to provide a control system using harmonic filters in active noise cancellation.

A further object of this invention is to provide a harmonic filter control system for both feedforward and feedback systems.

These and other objects will become apparent when reference is had to the accompanying drawings in which.

Figure 4A:
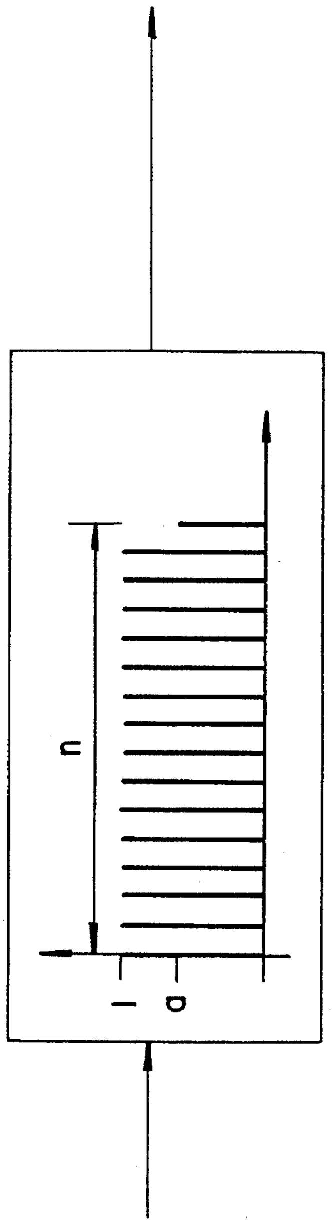
Figure 4B:
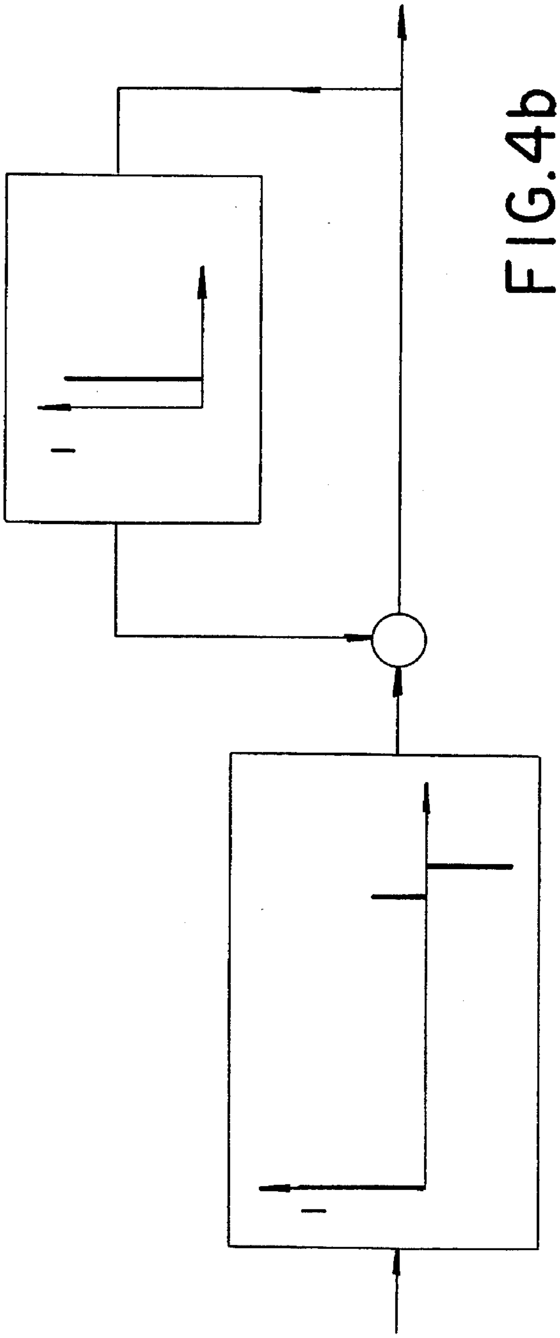
Figure 5:
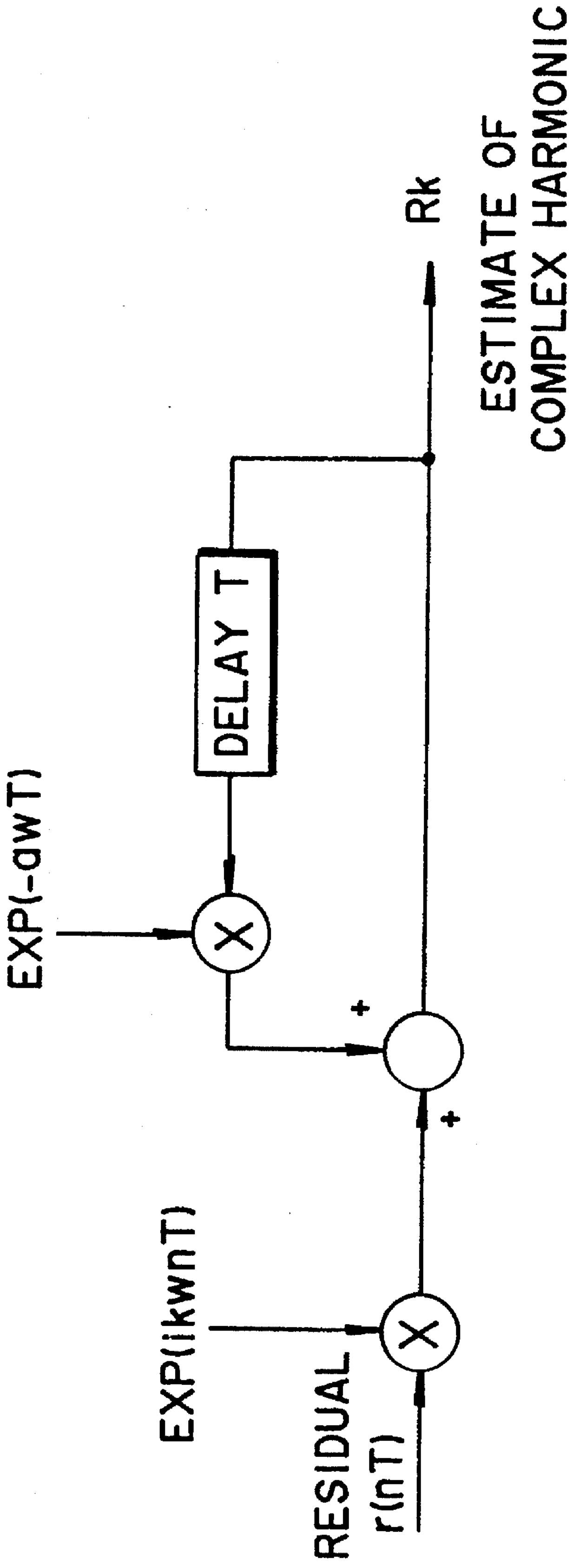

FIG. 4*a* is a representative showing of a moving average FIR filter,

FIG. 4*b* is a representative showing of a moving average recursive filter,

FIG. 5 is a diagrammatic showing of a recursive harmonic filter, and

Figure 6:
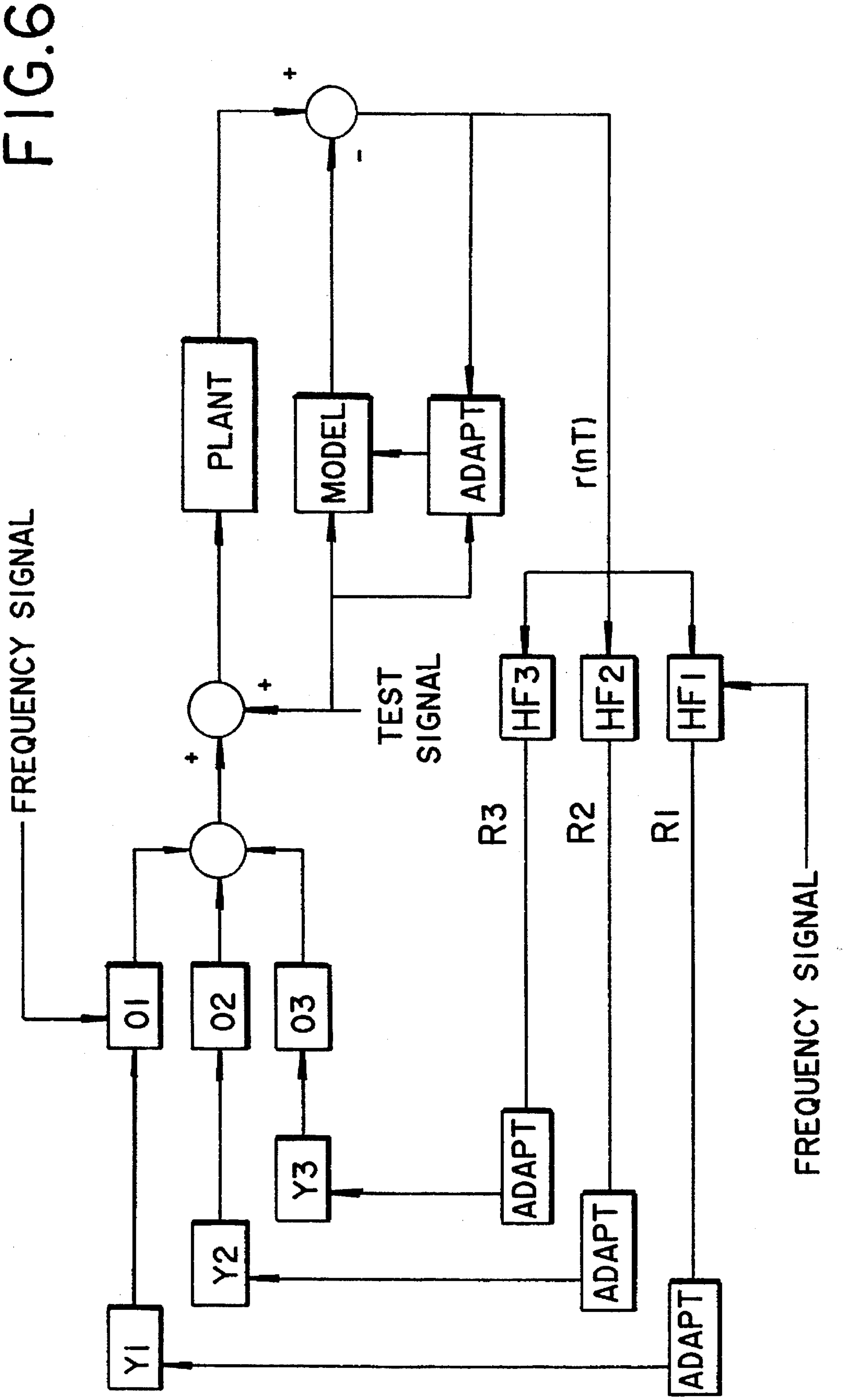

FIG. 6 is a diagram of a control system with on-line system identification.

SUMMARY OF THE INVENTION

This invention relates to a harmonic filter, and its use as part of a control system.

Figure 1:
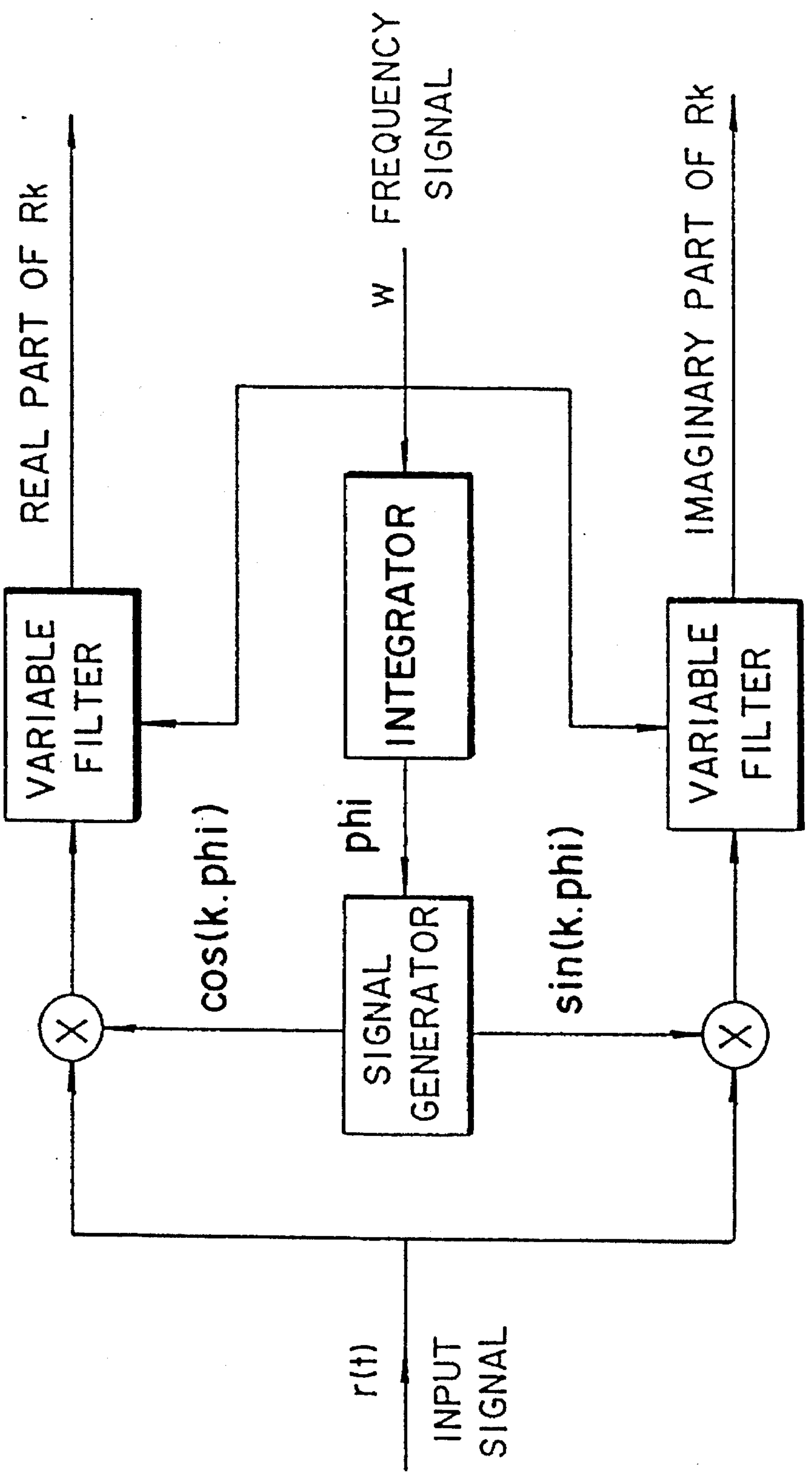
FIG. 1 is a flow diagram of a harmonic filter comprising the invention.

The harmonic filter is shown in FIG. 1. It consists of a pair of multipliers and low-pass filters. The input signal is multiplied by sinusoidal signals at the frequency of the harmonic component to be identified. The resulting signals are passed through the low-pass filters. The output from the low-pass filters are estimates of the real and imaginary parts of the desired complex harmonic amplitude. The phase of the sinusoidal signal is determined from a phase signal (from a tachometer or a phase locked loop for example) or from integrating a frequency signal. The bandwidth of the low-pass filter is variable and is determined by the fundamental frequency of the input signal.

For a control system, sensors are used to provide signals indicative of the performance of the system. These signals are sent to harmonic filters and the complex output from the filters are used to adapt the controller output.

For an active control system the harmonic filters are combined with output processors and an adaptive controller.

Figure 2:
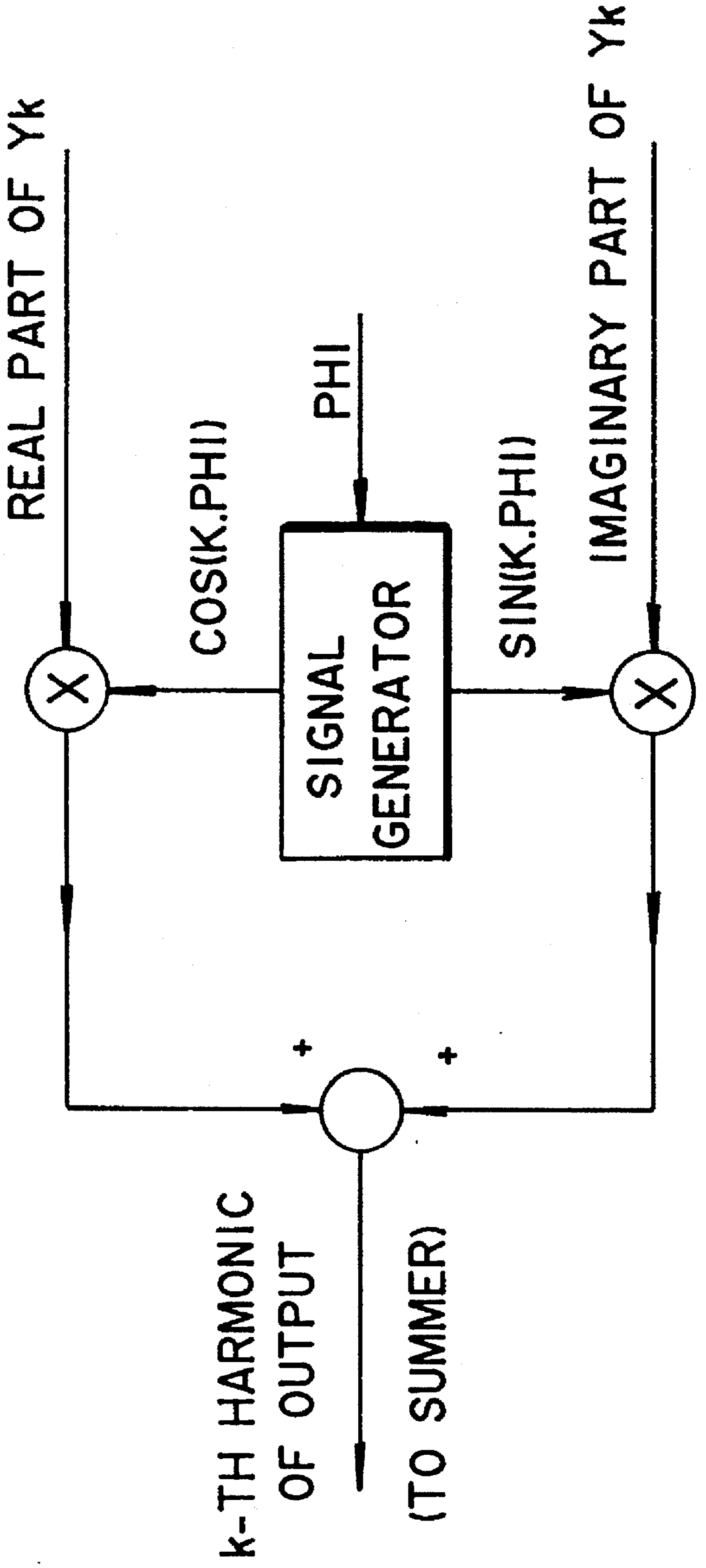
FIG. 2 shows an output processor for one harmonic.

The output processor for one harmonic is shown in FIG. 2. The real and imaginary pans of the complex amplitude of the output are determined by the controller. These are then multiplied by sinusoidal signals and summed to provide one harmonic of the output signal. The sinusoidal signals are the same as those used in the harmonic filters.

Figure 3:
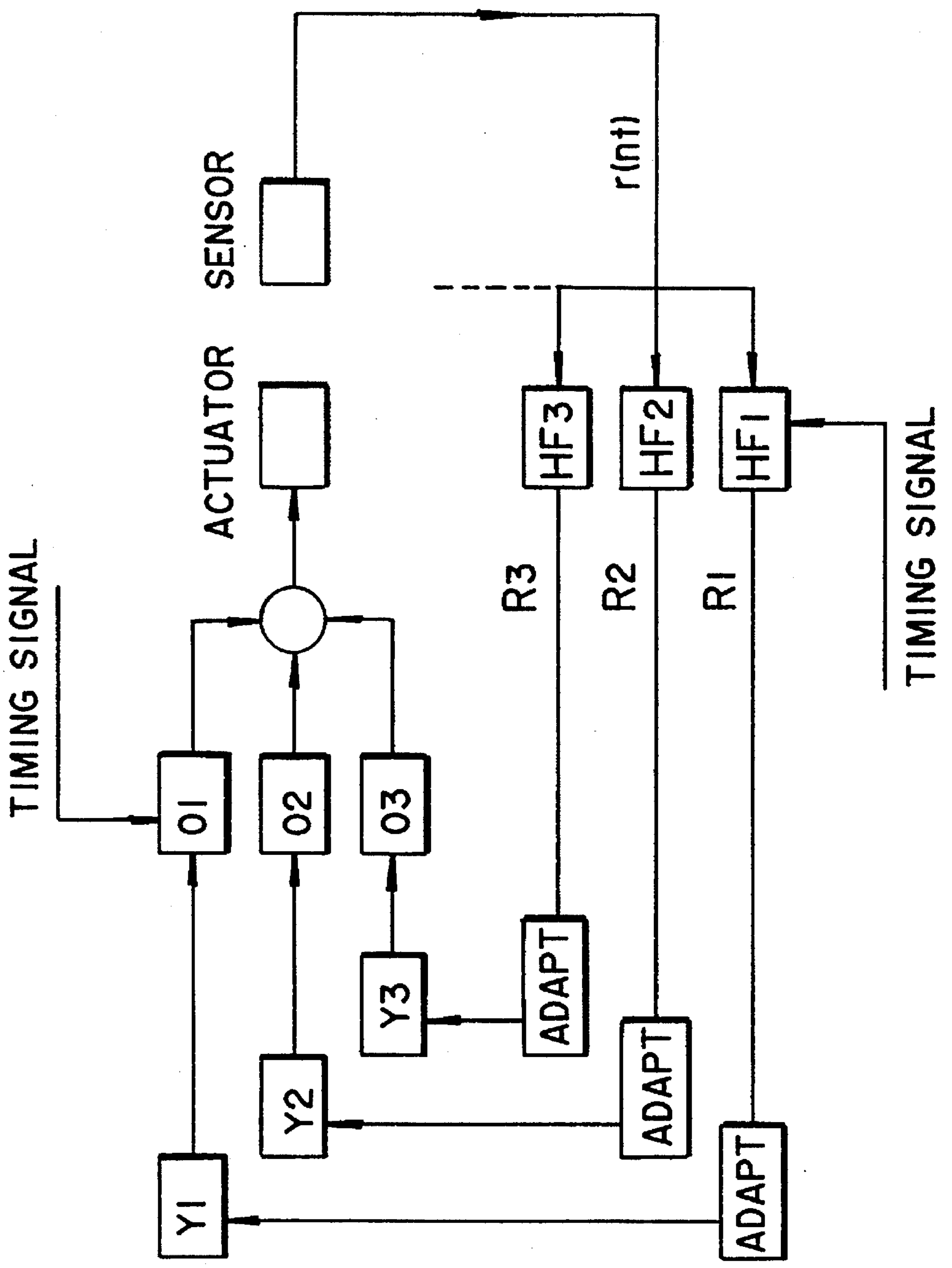
FIG. 3 is a diagrammatic view of a control system.

One embodiment of a control system using harmonic filters is shown in FIG. 3. Each harmonic of the controller output is generated by an output processor (01, 02, 03, . . .) which combines a complex amplitude, Y with sine and cosine signals. The controller output is obtained by summing these components. If the controller is to be used as part of an active control system, this output is then convened to the required form and sent to an actuator which produces the canceling disturbance. The input to the controller is a residual or error signal r(t). For an active control system r(t) is responsive to the combination of the original disturbance and the canceling disturbance as measured by a sensor. The residual signal is then passed to one or more harmonic filters (HF1, HF2, HF3, . . .). The harmonic components, (R1, R2, R3, . . .), of this residual signal are then used to adjust the complex amplitudes, (Y1, Y2, Y3, . . .), of the output.

DETAILED DESCRIPTION OF THE INVENTION

Harmonic Filter

A steady state, periodic signal r(t) can be written as a sum of harmonic components $$r(t) = \sum_{k=1}^{K} \{Re(R_k) \cdot \cos(k\omega t) - Im(R_k) \cdot \sin(k\omega t)\} \quad (1)$$

where k is the harmonic number, K is the total number of harmonics in the signal, $R_k$ is the complex amplitude of the signal at the k-th harmonic, and ω is the fundamental radian frequency.

The purpose of the harmonic filter is to determine the complex amplitudes $R_k$.

In the classical analysis for steady state signals, the complex amplitudes R are obtained by multiplying by a complex exponential and integrating over one or more complete cycles of the signal, so that $$R_k = 2/P \int_0^P r(t) \cdot e^{-ik\omega t}\, dt, \quad (2)$$

where P is the fundamental period of the signal and ω=2π/P is the frequency of the signal. $R_k$ is the discrete Fourier Transform of the signal. Alternatively, the integral is calculated over a longer time to give the continuous Fourier transform. These approaches cannot be used when the frequency or amplitude of the signal is changing.

The harmonic filter is designed to provide a real-time estimate of the harmonic components of a signal. The basic approach is to multiply the signal by the appropriate cosine and sine values and then to low-pass filter the results. This process, shown in FIG. 2, is equivalent to multiplying by a complex exponential signal, exp(ikωt), and then passing the result through a complex low-pass filter. The process is sometimes called heterodyning.

This approach has been used before with a fixed integrator in place of the low-pass filter. What is new about the approach here is that the bandwidth of the low-pass filter is automatically adjusted to maintain constant discrimination against other harmonically related components.

For a signal containing a single tone, the multiplication by the complex exponential acts as demodulator, and the resulting signal has components at d.c. (zero frequency) and at twice the original frequency. for harmonic signals the harmonic frequencies are all shifted by +/− the frequency of the exponential signal, therefore the resulting signal may have components at the fundamental frequency. These must be filtered out to leave only the d.c. component. With a fixed low-pass filter, the bandwidth of the filter must be set to cope with highest fundamental frequency likely to be encountered. When the system is operating at the lower frequencies, the low-pass filter is then much sharper than necessary, and therefore introduces much more delay than is necessary. By varying the bandwidth of the filter according to the current fundamental frequency it can be ensured that the harmonic filter has minimum delay. This is particularly important for use with control systems where any delay adversely affects the controller performance. By way of example, several forms of sampled data harmonic filter are now discussed. They differ in the way that the low-pass filtering is achieved.

1. Moving Average Finite Impulse Response Filter

One way of implementing the low-pass filter is by a moving average process.

This approach is most useful when the frequency changes more rapidly than the wave shape and is an approximation to the integral.

$$R_k(t) = 2/P \int_{t-p}^{t} r(\tau) \cdot e^{ik\phi(\tau)}\, d\tau, \tag{3}$$

where the period P is defined as the time taken for the phases to change by 2π radians, i.e.

$$\int_{t-p}^{t} \phi(r) = 2\pi. \tag{4}$$

The method is complicated by the fact that the period P is not generally an exact number of samples. If the sampling rate is high enough compared to the frequency of the harmonic being identified the truncation error can be neglected and the integral approximated by using the M samples in the current cycle. At time mT, the estimate can be obtained using a Finite Impulse Response (FIR) filter with M+1 coefficients. The filter output is $$(P/2) \cdot R_k(mT) = \sum_{n=0}^{M} W(n) \cdot X_k(m-n), \tag{5}$$

where X is the output from the multiplier $$X_k(n) = r(nT) \cdot e^{-ik\phi(nT)} \tag{6}$$

The filter coefficients, W(n) are all unity except for the last one. This last coefficient is a correction term which can be included to compensate for the block (cycle) length, P, which is not a whole number of cycles. If T is the time between samples, the block length can be written as $$P = (M+a)T, \text{ where } 0<a<1. \tag{7}$$

and the last coefficient is set equal to the value a for the current cycle, $$W_M = a_M \tag{8}$$

This filter is shown in FIG. 4*a*.

Both the length of the filter and the last coefficient of the filter are adjusted as the fundamental frequency of the noise changes.

This requires knowledge of the current phase, ϕ.

Other discrete approximations to the integral in equation (3) can be used (such as those based on the trapezium rule or Simpson's for example) and can also be implemented as FIR filters.

2. Moving Average Recursive Filter

The summation in equation (5) can be calculated recursively, that is, the next estimate can be calculated from the current estimate by adding in the new terms and subtracting off the old terms.

$$(P_{m+1}/2) \cdot R_k((m+1)T) = (P_m/2) \cdot R_k(mT) + X_k(m+1) + (a_{M+1}-1) \cdot X_{Xk}(m-M-1) - a_M X_k(m-M). \tag{9}$$

This filter is shown in FIG. 4*b*.

If the speed is increasing rapidly there may be additional terms to subtract. If the speed is decreasing rapidly there may be no points to subtract. So once again, the length of the FIR part of the filter and the value of the coefficients are varied depending on the fundamental frequency of the disturbance.

These moving average low-pass filters have zeros at the harmonic frequencies, and so are very effective at producing orthogonal signals.

3. Exponential Average

Yet another way of implementing a harmonic filter, which avoids the need for delay lines, is to use an exponential average rather than a moving average. The estimate is obtained recursively using $$R_{k\ l\ ((m+}1)T) = (1-e^{-a\omega T})r((m+1)T)e^{-ik\omega t} + e^{-a\omega T}R_k(mT). \tag{10}$$

where a is a positive constant which determines the effective integration time, T is the sampling period and ω is the fundamental frequency. Note that the bandwidth of the ;filter, i.e. the effective integration time, is scaled by the period of the noise. This is essential to obtain a uniform degree of independence of the harmonics.

The filter is shown in FIG. 5. It can be implemented in analog or sampled data form.

The advantage of using this exponential averaging rather than Ziegler's approach is that a reasonable degree of independence is obtained between the harmonics. This means that the convergence step size can be chosen independently for each harmonic.

Another advantage is that a can be varied dynamically to reduce the integration time during transients.

The three examples given above illustrate the desired properties of the low-pass filter. In order to separate out the different harmonic components, the bandwidth of the filter must be adjusted as the fundamental frequency of the disturbance varies. Note that the bandwidth of the filter is varied according to the fundamental frequency, not the frequency of the harmonic being identified. Additional benefits can be obtained if the low-pass filter is designed to have zeros in its frequency response at multiple fundamental frequency. There are many other ways of implementing low-pass filters with these properties which will be obvious to those skilled in the art of analog or digital filter design.

The exponential terms and sinusoidal terms used in the computation can be stored in a table. The resolution of the table must be chosen carefully to avoid errors. Alternatively, the exponential terms could be calculated at each output time, using interpolation from tabulated values, trigonometric identities or expansion formulae for example.

Output Processor for Active Control System

In some control systems the controller output varies on the same time scale as the output from the harmonic filters (see co-pending patent application [13]). In these applications, the outputs from the harmonic filters are used directly as inputs to a nonlinear control system.

In active control systems the controller output must have a particular phase relative to the disturbance to be controlled. In this case some output processing is required, which is effectively an inverse heterodyner. One example of this is now described.

In a sampled data embodiment of the system a constant rate is used for both input sampling and output. The sampling period is denoted by T. The output at time nT, which is calculated by the output processor, is $$y(nT) = \sum_{k=1}^{K} \{Re(Y_k) \cdot \cos(k\omega nT) - Im(Y_k) \cdot \sin(k\omega nT)\} \tag{11}$$

where ω is the fundamental radian frequency, Re denotes the real part and Im denotes the imaginary part, and where k is the harmonic number, K is the total number of harmonics in the signal and Y is the complex amplitude of the output at the appropriate harmonic. The values $Y_k$ can be stored in memory and the output calculated at each output time, as described by Ziegler.

The output processor uses the same sine and cosine terms as the input heterodyner.

The algorithms for adjusting the output values Y require knowledge of the harmonic components of the residual or error signal. These are provided by the outputs from the harmonic filters.

Adaptive Algorithm

The known frequency domain adaptive algorithms can be used to update the complex amplitudes of the output. A common choice for multichannel systems is to use $$Y_k^n=(1-\lambda)Y_k^{n-1}-\mu\cdot B(\omega)\cdot R_k^{n-1} \quad (12)$$

where $Y_k^n$ is the vector of outputs at the n-th update and the k-th harmonic, $R_k$ is vector of residual components, $\mu$ is the convergence step size, $\lambda$ is a leak applied to the output coefficients and $B(\omega)$ is a complex matrix related to the system transfer function matrix at the current frequency of this harmonic. In more sophisticated algorithms, $\lambda$ can be a complex matrix related to $A(\omega)$ and $B(\omega)$. If the system transfer function is $A(\omega)$, then for the LMS algorithm, $$B(\omega)=A^*(\omega), \quad (13)$$

where the star denotes the complex conjugate, and for a Newton's Algorithm a pseudo-inverse of A is used, for example $$B(\omega)=[A(\omega)^*A(\omega)]^{-1}A^*(\omega) \quad (14)$$

Other forms exist, especially for multichannel systems, which are designed to improve the conditioning of the inversion. These make use of the Singular Value Decomposition of A and are designed to improve remote performance (i.e. away from the sensors) and/or to reduce the power of the signals sent to the actuators.

A pseudo-inverse form is preferred since it allows the harmonic components to converge at equal rates—which is one of the main advantages of frequency domain algorithms. It is also preferred for multichannel systems since it allows for various spatial modes of the system to converge at a uniform rate.

The convergence step sizes for the algorithms which update at every sample are determined by the response time of the whole system. This is the settling time of the physical system (the time taken for the system to reach a substantially steady state) plus a variable delay due to the low-pass filter.

For use with the harmonic filters of this invention, the constant $\mu$ in (12) must be replaced by frequency dependent parameter, $\mu(\omega)$. This parameter must take account of the effective delay in variable filter. Some examples are now given.

Assuming a Newton style algorithm, the normalized step size for the moving average approach can take the form $$\mu_{MA}(\omega)=\mu.T/(\text{settling time}+\pi/\omega). \quad (15)$$

For the exponential average the normalized step size can take the form $$\mu_{exp}(\omega)=\mu.T/(\text{settling time}+\ln(2)\alpha\omega). \quad (16)$$

The choice of the constant $\mu$ is a compromise between rapid tracking and discrimination of measurement noise.

The constant $\pi$ can also be replaced by a frequency dependent parameter $\lambda(\omega)$. This parameter can be adapted to limit the amplitude of the output.

In the prior art the adaption process is performed every sample interval or at a rate determined by the cycle length (fundamental period) of the noise. The first approach has the disadvantage that the sampling rate and/or the number of harmonics to be controlled is limited by the processing power of the controller. The second approach has the disadvantage the computational requirements vary with the frequency, which may not be known in advance, and also the adaption rate is limited by the fundamental period of the disturbance.

With the system of this invention, the harmonic components are available every sample and the controller output is calculated every sample, but the adaption process can be performed at a slower rate if required. In one embodiment of the invention, this slower rate is determined in advance to be a fixed fraction of the sampling rate, in another embodiment of the invention the adaption is performed as a background task by the processor. This ensures that optimal use is made of the available processing power.

System Identification

The sampled data control systems described above use constant sampling rates. This facilitates the use of on-line system identification techniques to determine the system impulse response (and hence it transfer function matrix). Some of these techniques are well known for time domain control systems. Tretter describes some techniques for multichannel periodic systems.

For application here a random (uncorrelated) test signal is added to the controller output after the output processor but before the Digital to Analog Converter (DAC). The response at each sensor is then measured before the heterodyner, but after the Analog to Digital Converter (ADC). This response is then correlated with the test signal to determine a change to the relevant impulse response. In the well known noisy LMS algorithm the correlation is estimated from a single sample.

One embodiment of the scheme is shown in FIG. 6. This can be extended to multichannel system by applying the test signal to each actuator in turn or by using a different (uncorrelated) test signals for each actuator and driving all actuators simultaneously. The plant in FIG. 6 includes the DAC, smoothing filter, power amplifier, actuator, physical system, sensor, signal conditioning, anti-aliasing filter and ADC.

Other system identification techniques can be used such as described by Widrow, provided that the test signal is uncorrelated with disturbance.

While the invention has been shown and described in the preferred embodiment it is obvious that many changes can be made without departing from the spirit of the appended claims.

I claim:

1. A method for obtaining the complex harmonic amplitudes of an input signal with varying fundamental frequency, said method comprising multiplying said input signal by a pair of sinusoidal signals at the frequency of each harmonic component to be identified and passing the resulting signals through low-pass filters with variable bandwidth to provide estimates of the real and imaginary parts of the desired complex harmonic amplitude.

2. A method as in claim 1 in which the bandwidths of the low-pass filters are dependent upon the fundamental frequency of the signal.

3. A method as in claim 2 in which the fundamental frequency is obtained by measuring the fundamental frequency of the source of the input signal.

4. A method as in claim 1 in which the phase of the source of the input signal is measured and used to determine the phase of the sinusoidal signals.

5. A method as in claim 4 in which the phase of the source of the input signal is obtained by integrating a signal representative of the frequency of the source of the input signal.

6. A method for active cancellation of substantially periodic disturbances, said method comprising sensing the combination of the initial disturbance and the counter disturbance to obtain an input signal, multiplying said input signal by pairs of sinusoidal signals at the frequencies of the components to be identified, passing the resulting signals through low-pass filters with variable bandwidth to provide complex residual signals which are estimates of the real and imaginary parts of the complex harmonic amplitudes of the input signal, using said complex residual signals to adjust the complex amplitudes of an output signal, multiplying the real and imaginary parts of the complex amplitudes of said output signal by said sinusoidal signals and summing to produce the output signal, causing said output signal to generate a counter disturbance which is combined with the intial disturbance.

7. A method as in claim 6 in which the phase of the source of the input signal is measured and used to determine the phase of said sinusoidal signals.

8. A harmonic filter means for obtaining the complex harmonic amplitudes of an input signal with varying fundamental frequency, said method comprising means for generating sinusoidal signals at the frequency of the harmonic components to be identified, multiplication means for multiplying said input signal by said sinusoidal signals to generate first signals, low-pass filter means with variable bandwidth adapted to filter said first signals to provide second signals related to the real and imaginary parts of the desired complex harmonic amplitudes, characterised in that the bandwidths of the low-pass filters are dependent upon the fundamental frequency of the signal.

9. An active control system for cancelling substantially periodic disturbance, said system comprising sensor means for sensing the combination of the initial disturbance and the counter disturbance to obtain an input signal, harmonic filter means to produce complex residual signals which are estimates of the real and imaginary parts of the complex harmonic amplitudes of the input signal at the frequencies to be controlled, adaption means which uses said complex residual signals to adjust the complex amplitudes of an output signal, output processing means for multiplying the real and imaginary parts of said complex amplitudes by sinusoidal signals and summing to produce said output signal, actuator means for generating a counter disturbance which is combined with the intial disturbance.

10. A control system as in claim 6 including second sensor means for determining a phase signal related to the phase of the source of the input signal and in which said phase signal is used to determine the phase of said sinusoidal signals.

11. A control system as in claim 9 in which at least one of the harmonic filter means, the adaption means or the output processor means is a sampled data system.

12. A control system as in claim 9 in which at least one of the harmonic filter means, the adaption means or the output processor means is an analog circuit.

13. A control system as in claim 9 in which the adaption means is a digital processor and in which the step-size of the adaption algorithm is determined at least in part by the fundamental frequency of the disturbance.

14. A control system as in claim 9 in which the adaption means is an analog circuit providing a feedback loop and in which the gain of the feedback loop is determined at least in part by the fundamental frequency of the disturbance.

15. A control system as in claim 9 in which the harmonic filter means, the adaption means and the output processor means are implemented by one or more digital processors and in which the adaption process is performed as a background task.

16. A control system as in claim 9 in which a plurality of sensing means and/or actuating means are included and in which the adaption means takes account of any interaction between the actuator means and the sensor means.

17. A control system as in claim 9 including means for on-line system identification.

* * * * *